US 8,984,040 B2

United States Patent
Joye

(10) Patent No.: US 8,984,040 B2
(45) Date of Patent: Mar. 17, 2015

(54) MODULAR EXPONENTIATION METHOD AND DEVICE RESISTANT AGAINST SIDE-CHANNEL ATTACKS

(75) Inventor: Marc Joye, Fougeres (FR)

(73) Assignee: Thomson Licensing, Issy-les Moulineaux (FR)

( * ) Notice: Subject to any disclaimer, the term of this patent is extended or adjusted under 35 U.S.C. 154(b) by 408 days.

(21) Appl. No.: 13/469,139

(22) Filed: May 11, 2012

(65) Prior Publication Data

US 2012/0290634 A1 Nov. 15, 2012

(30) Foreign Application Priority Data

May 11, 2011 (EP) .................................. 11305568
Aug. 3, 2011 (EP) .................................. 11176404

(51) Int. Cl.
*G06F 7/38* (2006.01)
*G06F 7/72* (2006.01)

(52) U.S. Cl.
CPC ................ *G06F 7/722* (2013.01); *G06F 7/724* (2013.01); *G06F 7/723* (2013.01); *G06F 2207/7261* (2013.01)
USPC .......................................................... 708/491

(58) Field of Classification Search
CPC ....... G06F 7/7285; G06F 7/7214; G06F 7/72; G06F 7/7292; G06F 7/7221
USPC .......................................................... 708/491
See application file for complete search history.

(56) References Cited

U.S. PATENT DOCUMENTS 6,175,850 B1 * 1/2001 Ishii et al. ..................... 708/491
2009/0175455 A1 7/2009 Joye

OTHER PUBLICATIONS

EP search report dated Sep. 28, 2011.
Chevallier-Mames et al., "Low-Cost Solutions for preventing Simple Side-channel Analysis: Side-Channel Atomicity", IEEE Transactions on Computers, vol. 43, No. 6, Jun. 2004.
Amiel et al., "Distinguishing Multiplications from Square Operations", Selected Areas in Cryptography, Lecture Notes in Computer Science, vol. 5394, 2008.
Coron, "Resistance Against Differential power Analysis for Elliptic Curve Cryptosystems", Cryptographic Hardware and Embedded Systems 1717 of Lecture Notes in Computer Science, 1999, pp. 292-302.
Kocher et al., "Differential Power Anaiysis", CRYPTO '99, LNCS 1666, 1999, pp. 388-397.

(Continued)

*Primary Examiner* — Tan V. Mai
(74) *Attorney, Agent, or Firm* — Robert D. Shedd; Paul P. Kiel

(57) ABSTRACT

A method and apparatus for performing modular exponentiation using iterative modular multiplications steps and taking as input a first modulus N, a secret exponent d and a base x. During at least one modular multiplication step aiming at computing a result c from two values a, b and the first modulus N so that c=a·b mod N, a processor takes as input the two values a, b and the first modulus N from which are obtained two operands a', b' and a second modulus N' using operations with at most linear complexity—at least one of the two operands a', b' is different from the two values a, b, and the two operands a', b' are different when a is equal to b—so that the modular multiplication c=a·b mod N from a side-channel viewpoint behaves like a modular squaring except for when a' equals b'. An intermediate result c'=a'·b' mod N' is computed, and the result c is derived from the intermediate result c' using an operation with at most linear complexity; and the result c is used in the modular exponentiation.

9 Claims, 1 Drawing Sheet

(56) References Cited

OTHER PUBLICATIONS

Kocher, "Timing Attacks on Implementations of Diffie-Hellman, RSA, DSS, and Other Systems", Advances in Cryptolooy—CRYPTO '96, LNCS 10109, 1996, pp. 104-113.

Yen et al., "Checking before Output may not be Enough Against Fault-Based Cryptanalysis", IEEE Transactions on Computers 49(9), 2000, pp. 967-970.

Yen et al., "A Countermeasure against One Physical Cryptanalysis May Benefit Another Attack", ICIS 2001, LNCS 2288, 2002, pp. 414-427.

* cited by examiner

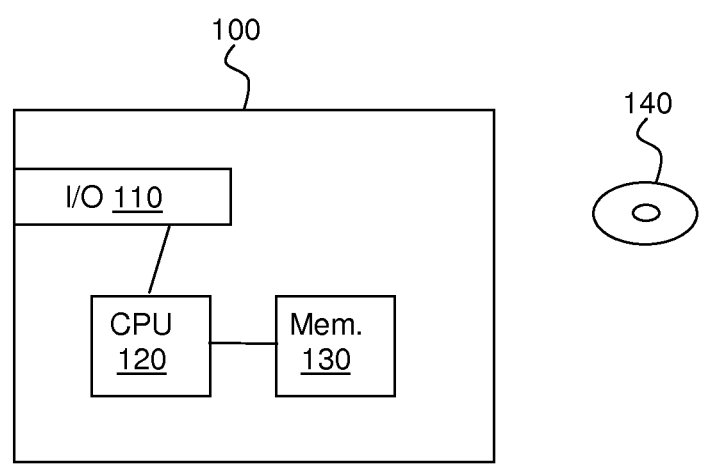

MODULAR EXPONENTIATION METHOD AND DEVICE RESISTANT AGAINST SIDE-CHANNEL ATTACKS

This application claims the benefit, under 35 U.S.C. §119 of EP Patent Application 11305568.5, filed 11 May 2011 and EP Patent Application 11176404.9 filed 03 Aug. 2011.

TECHNICAL FIELD

The present invention relates generally to cryptography, and in particular to modular exponentiation algorithms resistant to certain side-channel attacks.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A fundamental operation in public-key cryptography is modular exponentiation. On input N, x and d, $y=x^d \mod N$ is computed. There are, naturally, a host of prior art modular exponentiation algorithms, two examples of which being given hereinafter.

| Algorithm 1 - Left-to-right binary method |
| --- |
| Input: N, x $\in \mathbb{Z}/N\mathbb{Z}$ and d = $(d_{l-1}, ..., d_0)_2 \in \mathbb{N}$<br>Output: y = $x^d \mod N$<br>  1: R[0] ← 1 ; R[1] ← x<br>  2: for j = l−1 down to 0 do<br>  3:    R[0] ← R[0]² mod N<br>  4:    if ($d_j \neq 0$) then R[0] ← R[0] · R[1] mod N<br>  5: end for<br>  6: return R[0] |

| Algorithm 2 - Right-to-left binary method |
| --- |
| Input: N, x $\in \mathbb{Z}/N\mathbb{Z}$ and d = $(d_{l-1}, ..., d_0)_2 \in \mathbb{N}$<br>Output: y = $x^d \mod N$<br>  1: R[0] ← 1 ; R[1] ← x<br>  2: for j = 0 to l−1 do<br>  3:    if ($d_j \neq 0$) then R[0] ← R[0] · R[1] mod N<br>  4:    R[1] ← R[1]² mod N<br>  5: end for<br>  6: return R[0] |

While both methods are efficient, the skilled person will appreciate that they may be subject to side-channel, specifically Simple Power Analysis (SPA) attacks. See "Paul Kocher, Joshua Jaffe, and Benjamin Jun; Differential Power Analysis; In M. Wiener, editor, *Advances in Cryptology—CRYPTO'99*, volume 1666 of *Lecture Notes in Computer Science*, pages 388-397; Springer-Verlag, 1999"; and "Paul C. Kocher; Timing Attacks on Implementations of Diffie-Hellman, RSA, DSS, and Other Systems; In N. Koblitz, editor, *Advances in Cryptology—CRYPTO'96*, volume 1109 of *Lecture Notes in Computer Science*, pages 104-113. Springer-Verlag, 1996".

The main problem resides in the presence of the conditional branch, i.e. the 'if' statement.

One way to overcome this problem is to execute a multiplication in every loop of the round, in other words perform a fake multiplication whenever $d_j=0$. See "Jean-Sébastien Coron; Resistance Against Differential Power Analysis for Elliptic Curve Cryptosystems; In C. K. Koc and C. Paar, editors, *Cryptographic Hardware and Embedded Systems—CHES'99*, volume 1717 of *Lecture Notes in Computer Science*, pages 292-302. Springer-Verlag, 1999". The resulting implementations are however slower; the cost increases from around 1.5 multiplications per bit to 2 multiplications per bit. An added drawback is that the implementations become vulnerable to safe-error attacks; see "Sung-Ming Yen and Marc Joye; Checking before output may not be enough against fault-based cryptanalysis; *IEEE Transactions on Computers*, 49(9):967-970, 2000"; and "Sung-Ming Yen, Seung-Joo Kim, Seon-Gan Lim, and Sang-Jae Moon; A Countermeasure Against One Physical Cryptanalysis May Benefit Another Attack; In K. Kim, editor, *Information Security and Cryptology—ICISC 2001*, volume 2288 of *Lecture Notes in Computer Science*, pages 417-427. Springer-Verlag, 2002".

A better way to prevent SPA-type attacks is to use so-called side-channel atomicity; see "Benoît Chevallier-Mames, Mathieu Ciet, and Marc Joye; Low-Cost Solutions for Preventing Simple Side-channel Analysis: Side-Channel Atomicity; *IEEE Transactions on Computers*, 53(6):760-768, 2004". The corresponding algorithms are:

| Algorithm 3 - Left-to-right binary method (atomic) |
| --- |
| Input: N, x $\in \mathbb{Z}/N\mathbb{Z}$ and d = $(d_{l-1}, ..., d_0)_2 \in \mathbb{N}$<br>Output: y = $x^d \mod N$<br>  1: R[0] ← 1 ; R[1] ← x<br>  2: j ← l−1 ; b ← 0<br>  3: while (j ≥ 0) do<br>  4:    R[0] ← R[0] · R[b] mod N<br>  5:    b ← b ⊕ $d_j$; j ← j − ¬b<br>  6: end while<br>  7: return R[0] |

| Algorithm 4 - Right-to-left binary method (atomic) |
| --- |
| Input: N, x $\in \mathbb{Z}/N\mathbb{Z}$ and d = $(d_{l-1}, ..., d_0)_2 \in \mathbb{N}$<br>Output: y = $x^d \mod N$<br>  1: R[0] ← 1 ; R[1] ← x<br>  2: j ← 0; b ← 1<br>  3: while (j ≤ l−1) do<br>  4:    b ← b ⊕ $d_j$<br>  5:    R[b] ← R[b] · R[1] mod N; j ← j + b<br>  6: end while<br>  7: return R[0] |

In Algorithms 3 and 4, ⊕ denotes the XOR (exclusive OR) operator and ¬ denotes the negation operator (i.e., if b=0 then ¬b=1 and if b=1 then ¬b=0).

It will be appreciated that the cost is not increased, but remains at around 1.5 multiplications per bit. It will further be appreciated that side-channel atomicity is not restricted to the binary exponentiation methods. Further algorithms may be found in the aforementioned paper by Chevallier-Mames, Ciet and Joye.

While side-channel atomicity leads to very nice algorithms, it should be stressed that the methodology assumes that the multiplication operation is atomic. More explicitly, it assumes that it is not possible to make the distinction between a modular squaring and a modular multiplication by observing a suitable side channel. This assumption is not always fulfilled. Concrete attacks are reported in "Frédéric Amiel, Benoît Feix, Michael Tunstall, Claire Whelan, and William P. Marnane; Distinguishing Multiplications from Squaring Operations; In R. Avanzi, L. Keliher, and F. Sica, editors, *Selected Areas in Cryptography—SAC* 2008, volume 5394 of *Lecture Notes in Computer Science*, pages 346-360. Springer-Verlag, 2009".

It will thus be appreciated that there is a need for a solution in which a modular multiplication, from a side-channel viewpoint, behaves like a modular squaring. This invention provides such a solution.

SUMMARY OF INVENTION

In a first aspect, the invention is directed to a method of performing a modular exponentiation comprising iterative modular multiplications steps and taking as input a first modulus N, a secret exponent d and a base x. During at least one modular multiplication step aiming at computing a result c from two values a, b and the first modulus N so that c=a·b mod N, a processor takes as input the two values a, b and the first modulus N; obtains, from the two values a, b and the first modulus N, two operands a', b' and a second modulus N' such that at least one of the two operands a', b' is different from the two values a, b, and that the two operands a', b' are different when a is equal to b, so that the modular multiplication c=a·b mod N from a side-channel viewpoint behaves like a modular squaring except for when a' equals b'; wherein the operand a' is obtained from the value a, the operand b' is obtained from the value b, and the second modulus N' is obtained from the first modulus N using operations with at most linear complexity; computes an intermediate result c'=a'·b' mod N'; derives the result c from the intermediate result c', wherein c is obtained from c' using an operation with at most linear complexity; and uses the result c in the modular exponentiation.

In a first preferred embodiment, a'=2a, b'=b+N and N'=2N, and c'=c/2.

In a second preferred embodiment, a'=N−a, b'=b and N'=N, and c'=N−c. It is advantageous that the first modulus N is odd.

In a second aspect, the invention is directed to a processor for performing a modular exponentiation comprising iterative modular multiplications steps and taking as input a first modulus N, a secret exponent d and a base x. The processor is configured to, during at least one modular multiplication aiming at computing a result c from two values a, b and the first modulus N so that c=a·b mod N: take as input the two values a, b and the first modulus N; obtain, from the two values a, b and the first modulus N, two operands a', b' and a second modulus N' such that at least one of the two operands a', b' is different from the two values a, b, and that the two operands a', b' are different when a is equal to b, so that the modular multiplication c=a·b mod N from a side-channel viewpoint behaves like a modular squaring except for when a' equals b'; wherein the operand a' is obtained from the value a, the operand b' is obtained from the value b, and the second modulus N' is obtained from the first modulus N using operations with at most linear complexity; compute an intermediate result c'=a'·b' mod N'; and derive the result c from the intermediate result c', wherein c is obtained from c' using an operation with at most linear complexity; wherein the processor further is configured to use the result c in the modular exponentiation.

In a first preferred embodiment, a'=2a, b'=b+N and N'=2N, and c'=c/2.

In a second preferred embodiment, a'=N−a, b'=b and N'=N, and c'=N−c. It is advantageous that the first modulus N is odd.

In a third aspect, the invention is directed to a computer program product having stored thereon instructions that, when executed by a processor, perform the method of the first aspect.

BRIEF DESCRIPTION OF DRAWINGS

Preferred features of the present invention will now be described, by way of non-limiting example, with reference to the accompanying drawings, in which FIG. 1 illustrates an apparatus for performing an exponentiation resistant against certain side-channel attacks according to a preferred embodiment of the invention.

DESCRIPTION OF EMBODIMENTS

A main inventive idea of the present invention is, as already mentioned, to make a modular multiplication behave like a modular squaring from a side-channel viewpoint, which can be used to provide modular exponentiation algorithms that are resistant to certain side-channel attacks.

This may be achieved by evaluating a modular multiplication of a and b modulo N so that when a=b, the values of the two operands appearing in the modular multiplication are different.

A first preferred embodiment is based on the observation that for any elements a, b $\in \mathbb{Z}/N\mathbb{Z}$:

$$a \cdot b \bmod N = [(a+a) \cdot (b+N) \bmod 2N]/2$$

Proof: Define integers T=(a+a)·(b+N) and S=T/2. We have T mod 2N=T−⌊T/(2N)⌋2N=2(S−⌊S/N⌋N)=2(S mod N). Hence, we have (T mod 2N)/2≡S≡ab (mod N). The result now follows by noticing that (T mod 2N)/2 is in {0, . . . , N−1}.□

It is worth remarking that when a=b, one has (a+a)·(b+N)=(2a)·(a+N) and 2a≠a+N since otherwise one would have a=N, which is not possible as a is in $\mathbb{Z}/N\mathbb{Z}$ (i.e., in the set {0, 1, . . . , N−1}). In other words, when a=b, the values of the two operands appearing in the modular multiplication (a+a)·(b+N) mod 2N are different.

A second preferred embodiment relies on the identity:

$$a \cdot b \bmod N = N - [(N-a) \cdot b \bmod N]$$

Proof: Define integers S=N−[(N−a)·b mod N]. Since (−1)²=1, we obviously have S≡a·b (mod N). Further S $\in$ {0, . . . , N−1}.□

Again, provided that N is odd, it is worth remarking that when a=b the values of the two operands appearing in the modular multiplication (N−a)·b mod N are different. Indeed, when a=b, one has (N−a)·b=(N−a)·a and (N−a)≠a is always satisfied when N is odd.

If a' and b' are the operands and N' is the modulus in the modified modular multiplication and c' is the result of the modified modular multiplication that needs to be adjusted to obtain the correct output c, then it will be appreciated that the operands a' and b' and the modulus N' are obtained using operations with at most linear complexity—the skilled person will appreciate that N'=2N is normally implemented as an addition or a bit shift—as is the case for the operation used to obtain c from c'—the 'division' being implemented as a bit shift.

Either embodiment may then be used in Algorithms 3 and 4 described in the background section, giving rise to the following algorithms.

Algorithm 3' - L-to-R binary method (atomic) implementing the first embodiment

Input: N, x ∈ ℤ/Nℤ and d = $(d_{l-1}, ..., d_0)_2$ ∈ ℕ
Output: y = $x^d$ mod N
  1: R[0] ← 1 ; R[1] ← x
  2: j ← l−1 b ← 0
  3: while (j ≥ 0) do
  4:     R[0] ← ((R[0] + R[0]) · (R[b] + N) mod 2N)/2
  5:     b ← b ⊕ $d_j$; j ← j −¬b
  6: end while
  7: return R[0]

Algorithm 4' - R-to-L binary method (atomic) implementing the second embodiment

Input: N, x ∈ ℤ/Nℤ and d = $(d_{l-1}, ..., d_0)_2$ ∈ ℕ
Output: y = $x^d$ mod N
  1: R[0] ← 1 ; R[1] ← x
  2: j ← 0; b ← 1
  3: while (j ≤ l−1) do
  4:     b ← b ⊕ $d_j$
  5:     R[b] ← N − [(N − R[b]) · R[1] mod N]; j ← j + b
  6: end while
  7: return R[0]

It should be noted that there are instances where the rewritten formula yields a modular squaring. An example of this is the modular multiplication of 70 and 20 with N=120 using the formula of the first embodiment:

((70+70)·(20+120) mod 240)/2=(140·140 mod 240)/2= (19600 mod 240)/2=160/2=80. An example of this with the formula of the second embodiment is the modular multiplication of 70 and 51 with N=121:

121−((121−70)·51 mod 121)=121−(51·51 mod 121)=121− (2601 mod 121)=61.

It will however be appreciated that these occurrences are much rarer than the squarings in the original atomic scheme, as these occur more often than not. Further, when combined with certain randomization techniques, it may be difficult to produce such colliding values. This happens for example when the modular exponentiation y=$x^d$ mod N is computed as y=$[(x+r·N)^d$ mod t·N] mod N where t is a random k-bit integer for some security parameter k and r is a random integer in {0, . . . , t −1}.

FIG. 1 illustrates a device according to a preferred embodiment of the present invention. The device 100 comprises at least one interface unit 110 adapted for communication with other devices (not shown), at least one processor 120 and at least one memory 130 adapted for storing data, such as accumulators and intermediary calculation results. The processor 120 is adapted to compute a modular multiplication according to any of the embodiments of the inventive methods, and also to execute modular exponentiation algorithms implementing such multiplications, as previously described herein. A computer program product 140 such as a CD-ROM or a DVD comprises stored instructions that, when executed by the processor 120, performs the method according to any of the embodiments of the invention.

It will be appreciated that the present multiplication method can provide modular exponentiation algorithms that provide an increased protection against side-channel attacks.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of performing in an electronic device a modular exponentiation in a cryptographic operation comprising iterative modular multiplications steps and taking as input a first modulus N, a secret exponent d and a base x, the method being performed in a processor of the electronic device and comprising the steps, during at least one modular multiplication step aiming at computing a result c from two values a, b and the first modulus N so that c=a·b mod N, of:

taking, by the processor, as input the two values a, b and the first modulus N;

obtaining, by the processor, from the two values a, b and the first modulus N, two operands a', b' and a second modulus N' such that at least one of the two operands a', b' is different from the two values a, b, and that the two operands a', b' are different when a is equal to b, so that the modular multiplication c=a·b mod N from a side-channel viewpoint behaves like a modular squaring except for when a' equals b'; wherein the operand a' is obtained from the value a, the operand b' is obtained from the value b, and the second modulus N' is obtained from the first modulus N using operations with at most linear complexity;

computing, by the processor, an intermediate result c'=a'·b' mod N';

deriving, by the processor, the result c from the intermediate result c', wherein c is obtained from c' using an operation with at most linear complexity; and using, by the processor, the result c in the modular exponentiation of the cryptographic operation.

2. The method of claim 1, wherein a'=2a, b'=b+N and N'=2N, and wherein c'=c/2.

3. The method of claim 1, wherein a'=N−a, b'=b and N'=N, and wherein c'=N−c.

4. The method of claim 3, wherein the first modulus N is odd.

5. A non-transitory computer readable medium having stored thereon instructions that, when executed by a processor, perform the method of any one of claims 1 to 4.

6. A processor in an electronic device for performing a modular exponentiation in a cryptographic operation comprising iterative modular multiplications steps and taking as input a first modulus N, a secret exponent d and a base x, the processor being configured to, during at least one modular multiplication aiming at computing a result c from two values a, b and the first modulus N so that c=a·b mod N:

take as input the two values a, b and the first modulus N;

obtain, from the two values a, b and the first modulus N, two operands a', b' and a second modulus N' such that at least one of the two operands a', b' is different from the two values a, b, and that the two operands a', b' are different when a is equal to b, so that the modular multiplication c=a·b mod N from a side-channel viewpoint behaves like a modular squaring except for when a' equals b'; wherein the operand a' is obtained from the value a, the operand b' is obtained from the value b, and the second modulus N' is obtained from the first modulus N using operations with at most linear complexity;

compute an intermediate result c'=a'·b' mod N'; and derive the result c from the intermediate result c', wherein c is obtained from c' using an operation with at most linear complexity;

wherein the processor further is configured to use the result c in the modular exponentiation of the cryptographic operation.

7. The processor of claim 6, wherein a'=2a, b'=b+N and N'=2N, and wherein c'=c/2.

8. The processor of claim 6, wherein a'=N+a, b'=b and N'=N, and wherein c'=N−c.

9. The processor of claim 8, wherein the first modulus N is odd.

\* \* \* \* \*